Dec. 26, 1961  E. R. ZIEGLER  3,014,231
WINDSHIELD CLEANING APPARATUS
Filed Oct. 24, 1956  2 Sheets-Sheet 1
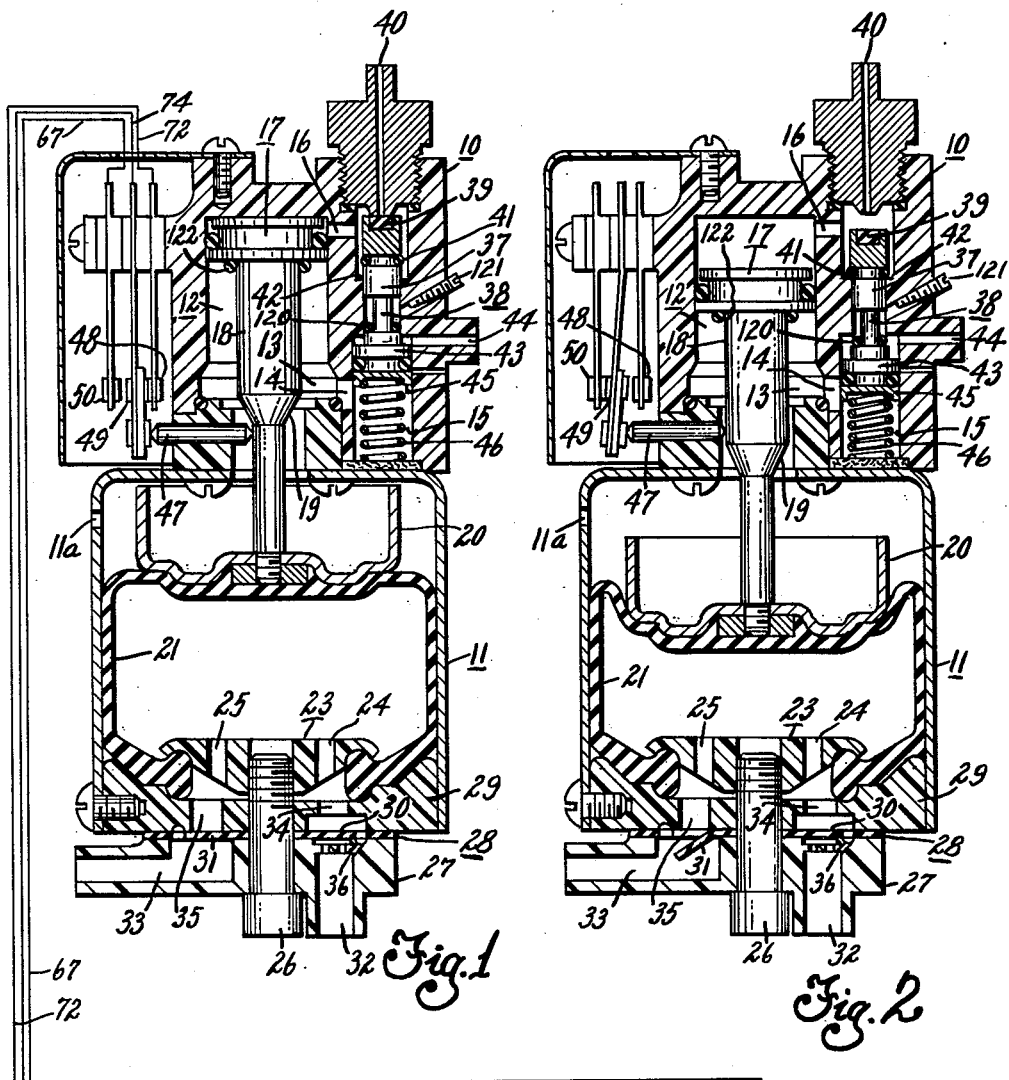
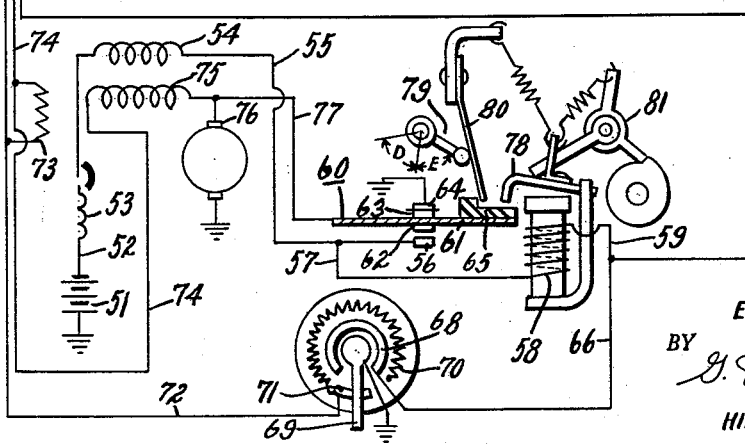
INVENTOR.
EUGENE R. ZIEGLER
BY G. H. Strickland
HIS ATTORNEY

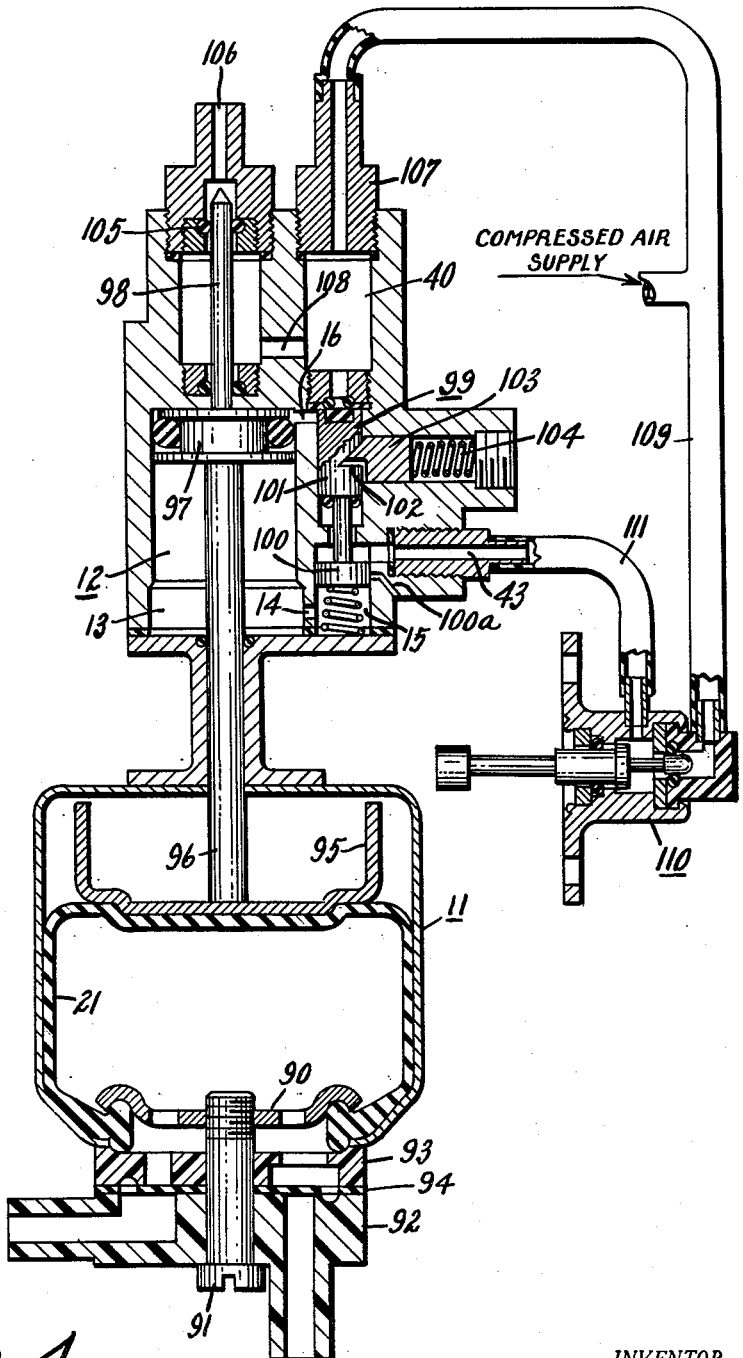

United States Patent Office 3,014,231
Patented Dec. 26, 1961

3,014,231
WINDSHIELD CLEANING APPARATUS
Eugene R. Ziegler, Spencerport, N.Y., assignor to General Motors Corporation, Detroit, Mich., a corporation of Delaware
Filed Oct. 24, 1956, Ser. No. 617,959
19 Claims. (Cl. 15—250.02)

This invention pertains to the art of windshield cleaning, and particularly to an improved washer and coordinator assembly for vehicle windshield cleaning apparatus.

Heretofore, commercially available coordinating devices for effecting simultaneous operation of windshield washing mechanism, and windshield wiping mechanism, which include means for timing the operation of the wiping mechanism after the completion of the wash cycle, have been susceptible to malfunction. One of the most objectionable features of the coordinator systems of today is that of the inability to interrupt, or turn off, the wiper motor in the event that the discharge conduits from the washer pump to the nozzle become obstructed, such as by freezing, or otherwise. Thus, with present day equipment, the wiper motor will continue on for an indeterminable length of time until the coordinator is disconnected from the system. The present invention relates to a combined washer and pump and coordinator assembly including means for preventing uncontrolled operation of the wiper motor in the event that the discharge lines from the washer pump to the washer nozzles should become obstructed. Accordingly, among my objects are the provision of a windshield pump assembly including means for bleeding the pump to the reservoir if the discharge conduits become obstructed; the further provision of a combined windshield washer pump and coordinator for controlling the simultaneous operation of a wiper motor and washer; the further provision of a pneumatically operated windshield washer pump; and the still further provision of a windshield washer and wiper coordinator including means for timing the operation of the wiping cycle after completion of the pump delivery stroke.

The aforementioned and other objects are accomplished in the present invention by incorporating a small bleed orifice in the pump assembly, which orifice bypasses the inlet check valve so that in the event that the discharge conduits become obstructed, the liquid solvent in the pump chamber can be bled back to the reservoir. Specifically, two embodiments of a washer pump and coordinator assembly are disclosed herein. In the first embodiment, the washer pump includes a rubber bellows having a natural recovery characteristic for effecting the intake stroke of the pump. The delivery stroke of the pump is effected by compressed air acting upon a piston, the rod of which is connected to the bellows. In accordance with conventional practice, the bellows is connected through oneway check valves with a reservoir of liquid solvent and with the discharge conduit, or conduits. Compressed air may be emitted to a pilot valve by means of a suitable manually operable valve located in the vehicle. When compressed air is emitted to the pilot valve, the pilot valve is depressed thereby admitting air to the motor piston which effects the delivery stroke of the pump. During movement of the motor piston, the wiper switch for controlling an electric wiper motor is actuated thereby initiating operation of the windshield wipers. The combined washer and pump of this assembly is specifically designed for use with an electric windshield wiper of the type disclosed in copending application, Serial No. 592,045, filed June 18, 1956, in the name of Peter R. Contant et al. and assigned to the assignee of this invention now Patent No. 2,828,460. However, it is readily apparent that the combined washer and coordinator of this assembly could be used in conjunction with other wiping motor assemblies, either of the pneumatic, hydraulic or mechanical type, and hence, the specific disclosure of this application is only by way of example and is not to be construed as a limitation.

When the motor piston reaches the end of its power stroke, means are incorporated for bypassing air around the piston to the underside of the pilot valve for moving the same to the off position. Consequently, the natural recovery characteristic of the flexible bellows will effect the intake stroke of the pump. At this time, continued operation of the wiper motor is timed by the washer pump, since until the completion of the intake stroke, the wiper switch is maintained closed.

In the second embodiment, the pump bellows is substantially the same as in the first embodiment. However, the control mechanism includes a pilot valve having a spring biased detent thereon. When air is admitted to the pilot valve, the pilot valve moves downwardly against its spring biased detent to apply air pressure to the motor piston. However, in this modified embodiment, it is contemplated to incorporate a pneumatic switch for initiating and terminating operation of the windshield wiper in timed relation with the washer. Thus, the motor piston has a rod extending in opposite directions, one of the rods acting as a valve which controls the application of air under pressure to a pneumatic switch or other device, of any suitable construction.

Further objects and advantages of the present invention will be apparent from the following description, reference being had to the accompanying drawings wherein preferred embodiments of the present invention are clearly shown.

In the drawings:

FIG. 1 is a longitudinal sectional view of the combined washer pump and coordinator assembly of this invention.

FIG. 2 is a longitudinal sectional view of the washer pump and coordinator shown during the delivery stroke.

FIG. 3 is a circuit diagram schematically illustrating an electric wiper motor and control circuit therefor particularly adapted to be used with the combined washer and coordinator of this invention.

FIG. 4 is a longitudinal sectional view of a modified combined washer and coordinator assembly constructed according to this invention.

With particular reference to FIG. 1, the combined washer pump and coordinator assembly includes a motor housing 10 and a pump housing 11. The motor housing 10 is composed of molded plastic material and is formed with a cylindrical bore 12, having an enlarged area 13 at one end thereof. The enlarged area 13 is connected by a passage 14 to a pilot valve bore 15. In addition, the upper end of the cylindrical bore 12 is connected by a passage 16 to the pilot valve bore 15. A motor piston 17 is disposed for reciprocable movement within the cylindrical bore 12. The motor piston 17 includes an axially extending rod 18 having a cam surface 19 thereon. The rod 18 extends into the cup-shaped pump housing 11 having a vent 11a which permits air to enter and escape from the housing. The lower end of the piston rod 18 is connected to a flange member 20 which is attached to a rubber bellows 21 constituting the pump. The rubber, or rubber-like bellows, has a natural recovery characteristic, so that when compressed, it will expand to the position shown in FIG. 1 without the use of springs, when pressure is released.

The lower end of the bellows 21 has an opening therein surrounded by a flange. The flange receives a clamp member 23 having apertures 24 and 25. The clamp member 23 threadedly engages a stud 26. The stud 26 clamps a valve body 27, a flap-type check valve assembly 28 and a valve seat 29 to the pump assembly. The valve assembly 28 includes a flap-type inlet check valve 30 and a flap-type outlet check valve 31. The inlet check valve 30 communicates with an inlet passage 32 in the valve body 27, inlet passage 32 being connected by any suitable pipe or conduit to a reservoir of liquid solvent, not shown. The outlet check valve 31 communicates with the discharge passage 33 of the valve body 27 which is connected by suitable conduit means to the discharge nozzles of a vehicle located on the cowl thereof.

The valve seat member 29 is formed with a pair of passages 34 and 35 which are aligned with the passages 24 and 25 respectively of the clamp member 23. In addition, it is pointed out that the valve body 27 is formed with a small bleed orifice 36 which by-passes the inlet check valve 30 and interconnects passages 32 and 34 at all times. This bleed passage will permit the discharge of liquid solvent from the bellows 21 during the delivery stroke thereof so that the liquid solvent can flow back to the reservoir if the discharge conduit 33 becomes obstructed for any reason, such as freezing.

Communication between the upper and lower section is prevented by a sealing land 37 on the pilot valve plunger 38. The pilot valve plunger 38 includes also a sealing end 39 of elastomeric material which is adapted to close the inlet port 40 connected to a source of compressed air. Downward movement of the pilot valve plunger 38 is limited by an O ring 41 which engages a shoulder 42 in the pilot valve bore 15. This seal also prevents escape of air down pilot valve bore. The pilot valve plunger 38 includes a second sealing land 43 axially spaced from the sealing land 37. In addition, the plunger 38 carries a second O ring 120 which blocks communication between inlet port 44 and a bleed valve 121 when the plunger 38 is in the position of FIG. 1. The bleed valve 121 allows air to escape after plunger 38 moves to the position of FIG. 2, and also permits air to escape after it moves to the "off" position. Moreover, the valve 121 can be adjusted to vary the duration of the wiping cycle. The upper portion of the sealing land 43 which is of substantially greater area than the sealing land 37 communicates with an inlet port 44. The lower end of the pilot valve plunger 38 carries a spring seat 45 and is biased upwardly by means of a compression spring 46.

The inlet port 44 is connected by a suitable conduit, not shown, to a manually operable control valve located on the instrument panel of the vehicle, likewise not shown. When the valve is depressed in the vehicle compressed air from a suitable source, not shown, flows to the inlet port, acts on the upper surface of land 43 so as to move the pilot valve plunger 38 downwardly compressing the spring 46. Downward movement of the pilot valve plunger 38 will cause a sealing portion 39 to move away from the compressed air inlet port 40, so that compressed air will be admitted from port 40 through passage 16 to the head end of the cylinder bore 12. The compressed air acting on the piston 17 will move the piston downwardly from the position in FIGURE 1, thereby effecting the delivery stroke of the pump.

With particular reference to FIGURES 1 and 2, it can be seen that during downward movement of the piston 17, the cam surface of the rod 18 coacts with a transversely mounted plunger 47. The plunger 47 moves to the left during downward movement of the piston 17 and constitutes a switch actuator. The washer wiper switch assembly is shown comprising a leaf spring contact 49, and a leaf spring contact 50. The leaf contacts 48 and 50 are substantially stationary, while the leaf spring contact 49 is engageable by a plunger 47 so that it can be moved between the positions shown in FIGURES 1 and 2. Thus, during the discharge stroke of the pump, the contact 49 is moved into engagement with the contact 50 out of engagement with the contact 48. However, upon completion of the intake stroke of the pump, the contact 49 which is spring biased toward the contact 48, moves out of engagement with contact 50 and into engagement with contact 48.

With particular reference to FIGURE 3, the manner in which the switch assembly of the combined washer and coordinator assembly controls an electric windshield wiper will be described. As alluded to hereinbefore, the washer and coordinator assembly of this invention is particularly designed for use with a wiper motor of the electric type as shown in copending application Serial No. 592,045. As seen in FIGURE 3, a battery 51 is connected by a wire 52 through a thermal overload switch 53 to one end of a series field winding 54. The other end of the series field winding 54 is connected by wire 55 to a switch contact 56. In addition, the wire 55 is connected by means of a wire 57 to one end of a relay coil 58, the other end of which is connected to a wire 59. The contact 56 constitutes part of a parking switch assembly designated generally by the numeral 60. This parking switch assembly includes a leaf spring member 61 having a pair of contacts 62 and 63. In addition, the parking switch includes a contact 64 which is connected to ground. The leaf spring 61 incorporates a combined latch and actuator member 65 of insulating material. The wire 59 is connected to wires 66 and 67. Wire 67 is connected to switch contact 50 of the combined washer and coordinator assembly. Wire 66 is connected to a contact member 68 of a manually controlled switch.

The manually controlled switch includes a movable contact member 69 having portions engageable with a rheostat 70 and, in the off position with a contact 71. The contact member 69 is connected to ground as shown. The contact member 71 is connected to one end of the rheostat 70, and is also connected to a wire 72 which is connected to contact 48 of the washer and coordinator assembly. In addition, the wire 72 is connected to one end of a resistor 73, the other end of which is connected to a wire 74. One end of wire 74 is connected to the contact 49 of the washer and coordinator assembly, and the other end of the wire 74 is connected to one end of the shunt field winding 75. The other end of the shunt field winding 75 is connected to one end of the armature 76, as well as by wire 77 with the lead spring 61 of the parking switch 60. The other terminal of the armature 76 is, of course, connected to ground.

The relay coil 58, when energized, attracts an armature 78, having an end adapted to engage the actuator 65 so as to move contact 62 into engagement with contact 56, while separating contact 63 and 64. When contact 62 engages contact 56, the electric motor becomes energized thereby imparting movement to wiper blades, not shown. Numeral 79 depicts an oscillatory arm actuated by the electric motor through suitable motion converting mechanism as disclosed in the aforementioned copending application. During the normal wiping stroke of the motion converting mechanism, the arm 79 oscillates throughout an amplitude depicted by angle D. However, to accomplish parking of the blades adjacent to the cowl of the windshield, the lever arm 79 is movable throughout the angle D plus E to the position shown in FIGURE 3. When the lever arm is moved to the position shown in FIGURE 3 engages a latch arm 80 of spring material. However, during oscillation of the lever arm 79 throughout the angle D, the latch arm 80 engages the actuator 65 and maintains contact 62 in engagement with contact 56 irrespective of whether the relay coil 58 is energized or deenergized.

The relay armature 78 also controls a latch mechanism indicated generally by numeral 81, which, in turn controls the amplitude of oscillation imparted to the windshield wipers through a variable crank throw mechanism. The details of the windshield wiper actuating mechanism can be ascertained from the aforementioned copending application, and will not be described in detail herein.

Suffice it to say that the windshield wiper motor can be energized manually, independently of the washer and coordinator, by manipulation of the switch contact member 69. However, to effect combined operation of the wiper motor after the completion of the delivery stroke of the pump, the switch assembly of the washer and coordinator assembly is used. Thus, during the delivery stroke of the pump, the pin 47 is moved to the position of FIGURE 2, thereby completing the circuit between contacts 49 and 50. In so doing, the relay coil 58 is energized from the battery 51 through the overload switch 53, the series field winding 54, a wire 55, the wire 57, the coil 58, the wire 59, the wire 67, the contact 50, the contact 49, the wire 74, the resistor 73, the wire 72, the contact 71, the contact 69, and back to ground. At the same time the wiper motor is energized for high speed operation, since the resistor 73 is connected in series with the shunt field winding 75. Thus, the wiper motor will operate during the delivery stroke of the washer pump.

After completion of the delivery stroke of the washer pump, the enlarged area 13 of the cylinder bore 12 permits the compressed air from the top of the piston 17 to pass through the passage 14 and into the lower portion of the pilot valve bore 15. This pressure acting on the bottom of the sealing land 43 plus the force of the spring 46 moves the pilot valve plunger 37 upwardly. In so doing, the sealing member 39 engages the inlet air port 40 thereby interrupting the application of compressed air to the top of the piston 17. The air compressed in piston cylinder is now free to escape, back through passage 16, valve bore 15 and out through adjustable valve 121. The regulation of this valve greatly affects the duration of the wiping cycle which in conjunction with the rate of flow of washing fluid into the bellows, preparatory to the next washing cycle, times the duration of the wipe.

The O ring 122 encompassing the piston rod 18, seals the piston rod 18 against leakage when the piston reaches its greatest extension. The O ring 122 cooperates with the shouldered portion of the enclosure. This prevents the air from passing through the enlarged portion of cylinder 12 from escaping into bellows chamber, and thus allow the air to exert pressure upon the under side of small piston 38. The return of piston opens a passage to bellows chamber allowing air to flow into cylinder when the piston returns to an operating position, thereby preventing a vacuum from being formed as evident if not prevented.

The natural recovery characteristic of the bellows 21 will cause the bellows 21 to expand to effect the intake stroke of the pump thereby moving the piston 17 upwardly to the position of FIGURE 1. As the piston 17 moves upwardly, it will time the operation of the wiper motor, and during the latter portion of the upward movement of the piston 17, the plunger 47 will move from the position of FIGURE 2 to the position of FIGURE 1 thereby engaging contacts 48 and 49 so as to interrupt operation of the wiper motor. More particularly when contact 48 engages contact 49, the relay coil 58 is deenergized. However, the latch arm 80 still maintains energization of the motor until the wiper blades reach the parked position, since when the relay coil is deenergized the latch arm 81 causes the throw of the crank mechanism to be increased. When the wiper blades reach the parked position, the lever arm 79 will deflect the leaf spring 80 thereby permitting the leaf spring 61 to move upwardly separating contacts 56 and 62, and engaging contacts 63 and 64. At this time, the motor is deenergized, and contacts 63 and 64 close a self-generative dynamic braking circuit which arrests movement of the wiper blades in the parked position.

With particular reference to FIGURE 4, a modified combined washer and coordinator assembly will be described. In FIGURE 4 similar numerals denote similar parts as described in conjunction with FIGURES 1 and 2. Thus, the washer pump includes a rubber-like bellows 21 disposed within a pump housing 11. In FIGURE 4 embodiment, the bellows is clamped by a member 90 to a stud 91, which also retains the valve body 92 and the valve seat 93 and valve assembly 94 connected with the pump housing 11. The bellows has attached thereto a flange member 95 which is connected to the lower end of a piston rod 96. The piston rod is connected to a motor piston 97, which also has a rod portion 98 extending upwardly therefrom. A piston 97 is disposed for reciprocable movement within a cylindrical bore 12 having an enlarged annular area 13 which communicates by passage 14 to the servo, or pilot valve bore 15. However, in this embodiment the pilot valve comprises a plunger 99 having a lower sealing land 100 of substantially greater area than the upper sealing surface 101. The lower sealing land 100 normally closes a vent 100a. In addition, the plunger 99 is formed with a notch 102 which cooperates with a spring biased detent 103. The detent 103 is biased by a spring 104, and normally maintains the pilot valve plunger 99 in the position shown in FIGURE 4. However, upon application of compressed air to the inlet port 43 which acts on the land 100, the pilot valve plunger 99 will move downwardly thereby opening inlet port 40 to the cylindrical bore 12 through passage 16. Thus, compressed air will act on the upper end of the piston 97 and move the same downwardly to effect the delivery stroke of the pump.

During the delivery stroke, or more particularly during downward movement of the piston 97, the rod 98 likewise moves downwardly. The rod 98 cooperates with an O ring seal 105, and when the end thereof moves below the O ring seal 105, compressed air from the cylindrical bore 12 passes through a bore 106 to a suitable pneumatic switch or other device, not shown. The switch will embody contacts similar to those described in connection with the embodiment of FIGURES 1 and 2, but will be actuated pneumatically rather than mechanically as shown therein. In addition, the washer pump and coordinator of FIGURE 4 is shown including a compressed air inlet fitting 107 for the inlet port 40. Ports 106 and 107 are connected by passage 108. Operation of the modified embodiment of FIGURE 4 is substantially the same as described in conjunction with FIGURES 1 and 2. The inlet port 107 is connected by conduit 109 to a valve assembly 110, as is the inlet port 43 by conduit 111. The valve assembly 110 need only be momentarily depressed to interconnect conduits 109 and 111. Thus, when compressed air is admitted to inlet port 43, the air acting on the sealing land 100 moves the plunger 99 downwardly. Movement of plunger 99 downwardly connects the source of compressed air with the upper side of the piston 97, thereby effecting downward movement of the piston 97 to effect the delivery stroke of the pump by compressing the bellows 21. As soon as the rod portion 98 passes through the seal 105, the wiper motor is started. Since in both embodiments, the bellows 21 is compressed prior to initiating operation of the windshield wiper unit, the washer unit discharges liquid solvent onto the windshield before the wiper unit is energized. After completion of the delivery stroke, the piston 97 will be in the enlarged area 13 thereby admitting the air from the cylinder bore 12 to pass through passage 14 and through the lower side of the pilot valve plunger 99. The air acting on land 100 will move the plunger 99 upwardly, since at this time the air supply through passage 43 has been interrupted. Accordingly, the sealing portion 101 will close the inlet portion 40, and the natural recovery characteristic of the bellows 21 will cause it to expand to effect the intake stroke thereof. Thus, the piston 97 will move upwardly to the position of FIGURE 4 and after completion of the intake stroke of the pump, the wiper motor will be deenergized.

From the foregoing, it is readily apparent that the present invention provides a unique combined washer and coordinator assembly which effectively times the operation of the wiper motor only after completion of the delivery stroke. Moreover, in one embodiment of the present invention, the coordinator will permit the wiper and motor to be turned off automatically in the event that the discharge conduit become obstructed for one reason or the other.

While the embodiments of the present invention as herein disclosed, constitute preferred forms, it is to be understood that other forms might be adopted.

What is claimed is as follows:

1. A windshield washer pump assembly comprising, a pump housing, a motor housing, a resilient bellows pump disposed within the pump housing and constituting a liquid displacing member, a reciprocable piston disposed within the motor housing and operatively connected to the bellows for effecting the delivery stroke thereof, the natural recovery characteristics of said bellows effecting the intake stroke thereof, a cylinder within which said motor piston is reciprocable, said cylinder having an enlarged bore adjacent one end thereof, pilot valve means for controlling the application of fluid under pressure to the opposite end of said cylinder bore, and passage means connecting the enlarged bore of said cylinder and said pilot valve for automatically interrupting the application of fluid under pressure to said piston upon completion of the delivery stroke of said bellows.

2. The combination set forth in claim 1 wherein said pilot valve includes a plunger having sealing lands of different diameter resilient means biasing said pilot valve to an off position, and manually operable means for applying fluid under pressure to the larger area sealing land, for moving said valve plunger to an on position.

3. The combination set forth in claim 1 wherein said piston includes a rod constituting the operative connection between the piston and the bellows, said rod having a cam surface thereon, and a slidably mounted pin engageable with the cam surface of said rod for actuating a wiper control switch.

4. The combination set forth in claim 1 wherein said pilot valve comprises a plunger having sealing lands of different diameter, a detent engageable with said pilot valve plunger for normally maintaining the pilot valve plunger in the off position, and manually controllable means for applying fluid under pressure to the larger sealing land of said plunger for effecting movement thereof to the on position.

5. The combination set forth in claim 1 wherein said piston includes a rod constituting the operative connection between the piston and the bellows, and wherein said piston includes a second rod extending axially in the direction opposite to that of the first rod, said second rod controlling and constituting a valve for applying pressure fluid from the cylinder bore to a pneumatic switch actuator for controlling a wiper motor.

6. A windshield washer pump assembly comprising, a pump housing, a motor housing, a liquid displacing member disposed in said pump housing, a reciprocable piston disposed within said motor housing and operatively connected to said liquid displacing member for effecting the delivery stroke thereof, means for effecting the intake stroke of the liquid displacing member, means for effecting movement of said reciprocable piston to effect the delivery stroke of said liquid displacing member, and means coacting with the operative connection between said piston and said liquid displacing member for actuating a wiper control during the delivery stroke of said liquid displacing member.

7. A windshield washer pump assembly comprising, a pump housing, a motor housing, a liquid displacing member disposed in said pump housing, a reciprocable piston disposed within said motor housing and operatively connected to said liquid displacing member for effecting the delivery stroke thereof, means for effecting the intake stroke of the liquid displacing member, means for effecting movement of said reciprocable piston to effect the delivery stroke of said liquid displacing member, and means mechanically operated by said piston for actuating a wiper control to initiate operation of a wiper motor during the delivery stroke of said liquid displacing member.

8. A windshield pump assembly comprising, a pump housing, a motor housing, a liquid displacing member disposed within the pump housing, a reciprocable piston disposed within the motor housing and operatively connected to the liquid displacing member for effecting a delivery stroke thereof, means for effecting the intake stroke of said liquid displacing member, and means for controlling application of fluid under pressure to said motor housing so as to effect the delivery stroke of said liquid displacing member including a pilot valve having sealing lands of different diameter, resilient means biasing said pilot valve to a closed position and manually operable means for applying fluid under pressure between said sealing lands for effecting movement of said pilot valve to an open position.

9. A windshield pump assembly comprising, a pump housing, a motor housing, a liquid displacing member disposed within the pump housing, a reciprocable piston disposed within the motor housing and operatively connected to the liquid displacing member for effecting a delivery stroke thereof, means for effecting the intake stroke of said liquid displacing member, and means for controlling application of fluid under pressure to said motor housing so as to effect the delivery stroke of said liquid displacing member including a pilot valve having sealing lands of different diameter, a detent engageable with said pilot valve for normally maintaining the pilot valve in a closed position and manually operable means for applying fluid under pressure between said sealing lands of said pilot valve for effecting movement of said pilot valve to an open position.

10. The combination set forth in claim 8 wherein said motor housing includes an adjustable bleed valve which communicates with the motor housing when the pilot valve is in the closed position, said bleed valve controlling the time interval required for the intake stroke of said liquid displacing member.

11. A windshield cleaning system including, a washer unit including a resilient bellows pump having fluid pressure means for effecting the delivery stroke thereof to deliver washing liquid onto a windshield, said bellows automatically effecting the intake stroke upon said fluid pressure being relieved, a wiper unit for operating on the windshield area to which the liquid is delivered, and wiper unit control means actuated by said fluid pressure operated means to automatically initiate operation of the wiper unit during the delivery stroke of the pump and automatically arrest operation of the wiper unit when the intake stroke of the pump is completed.

12. A windshield cleaning system including, a washer unit including a resilient bellows pump having fluid pressure operated means for effecting the delivery stroke thereof to deliver washing liquid onto a windshield, said bellows automatically effecting the intake stroke upon said fluid pressure being relieved, an electric wiper unit for operating on the windshield area to which the liquid is delivered, and wiper unit switch means actuated by said fluid pressure operated means to automatically initiate operation of the wiper unit during the delivery stroke of the pump and automatically arrest operation of the wiper unit upon completion of the intake stroke of said pump.

13. A pneumatically operated washer pump comprising, a housing having a resilient bellows pump therein with an intake stroke and a delivery stroke, means for supplying fluid under pressure to said housing to compress said bellows and effect the delivery stroke thereof, and means automatically venting said housing to atmosphere upon completion of the delivery stroke of said bellows to enable said bellows to effect the intake stroke.

14. A pneumatically operated washer pump comprising, a housing having a resilient bellows pump therein with an intake stroke and a delivery stroke, a wiper control disposed within said housing, a rod attached to said bellows and movable therewith for actuating said wiper control upon movement of said bellows, means supported by said housing and engageable with said rod for guiding its movement, means for supplying fluid under pressure to said housing to compress said bellows and effect the delivery stroke thereof, and means automatically venting said housing to atmosphere upon completion of the delivery stroke of said bellows to enable said bellows to effect the intake stroke.

15. A windshield cleaning system including a washer unit means for delivering a washing liquid onto a windshield, said means including a resilient bellows pump having motor means operative by pressure fluid differential for effecting the delivery stroke thereof, said resilient bellows automatically effecting the intake stroke upon the relief of said fluid pressure differential, a wiper unit for operating on the windshield area to which the liquid is delivered, and wiper unit control means responsive to operation of said motor means to automatically initiate operation of the wiper unit during the delivery stroke of the pump and automatically arrest operation of the wiper unit when the intake stroke of the pump is completed.

16. A windshield cleaning system including, a washer unit means for delivering washing liquid onto a windshield, said means including a pump having motor means operative by pressure fluid differential to effect the delivery stroke of said pump, means operable to effect the intake stroke of said pump upon the relief of said fluid pressure differential, a wiper unit for operating on the windshield area to which the liquid is delivered, and wiper unit control means responsive to operation of said motor means to automatically initiate operation of the wiper unit during the delivery stroke of said pump and automatically arrest operation of the wiper unit when the intake stroke of the pump is completed.

17. A windshield cleaning system including, a washer unit means for delivering a washing liquid onto a windshield, said means including a pump having motor means operative by pressure fluid differential to effect the delivery stroke of said pump, means operable to effect the intake stroke of said pump upon the relief of said fluid pressure differential, control means arranged for operation of said motor means, a wiper unit for operating on the windshield area to which the liquid is delivered, and wiper unit control means responsive to operation of said motor means to automatically initiate operation of the wiper unit during the delivery stroke of the pump and automatically arrest operation of the wiper unit when the intake stroke of the pump is completed.

18. A windshield cleaning system including, a washer unit means for delivering washing liquid onto a windshield, said means including a bellows pump having motor means operative by pressure fluid differential to collapse said bellows pump and effect the delivery stroke thereof, means operable to expand said bellows pump to effect the intake stroke thereof upon the relief of said fluid pressure differential, a wiper unit for operating on the windshield area to which the liquid is delivered, and wiper unit control means responsive to operation of said motor means to automatically initiate operation of the wiper unit during the delivery stroke of said pump and automatically arrest operation of the wiper unit when the intake stroke of the pump is completed.

19. A windshield cleaning system including, a washer unit means for delivering a washing liquid onto a windshield, said means including a bellows pump having motor means operative by pressure fluid differential for collapsing said bellows pump to effect the delivery stroke thereof, means operable to expand said bellows pump to effect the intake stroke thereof upon the relief of said fluid pressure differential, control means arranged for operation of said motor means, a wiper unit for operating on the windshield area to which the liquid is delivered, and wiper unit control means responsive to operation of said motor means to automatically initiate operation of the wiper unit during the delivery stroke of the pump and automatically arrest operation of the wiper unit when the intake stroke of the pump is completed.

References Cited in the file of this patent

UNITED STATES PATENTS

| | | |
|---|---|---|
| 2,687,696 | Theis | Aug. 31, 1954 |
| 2,688,514 | Oishei et al. | Sept. 7, 1954 |
| 2,743,473 | Oishei | May 1, 1956 |
| 2,873,467 | Oishei | Feb. 17, 1959 |
| 2,877,485 | Oishei | Mar. 17, 1959 |

FOREIGN PATENTS

| | | |
|---|---|---|
| 164,321 | Australia | July 25, 1955 |
| 296,073 | Great Britain | 1929 |
| 731,898 | Great Britain | June 15, 1955 |
| 1,111,220 | France | Oct. 26, 1955 |